US009682429B2

(12) United States Patent
Eakins et al.

(10) Patent No.: US 9,682,429 B2
(45) Date of Patent: Jun. 20, 2017

(54) REACTION TOOL AND METHOD FOR FORMING OPENINGS IN AN AIRCRAFT FUSELAGE JOINT

(71) Applicant: The Boeing Company, Huntington Beach, CA (US)

(72) Inventors: Robert William Eakins, Charleston, SC (US); Ryan Paul Evans, Trenton, IL (US); Jason Kenneth Hahn, Summerville, SC (US); Richard Lynn Hopkins, North Charleston, SC (US); Maro Ellen Mansourian, Charlestown, SC (US); Diego Fernando Mayorga, Charlestown, SC (US); Abdifatah Mustafa Mohamed, Summerville, SC (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 14/692,866

(22) Filed: Apr. 22, 2015

(65) Prior Publication Data

US 2016/0311034 A1 Oct. 27, 2016

(51) Int. Cl.

| | |
|---|---|
| ***B23B 41/16*** | (2006.01) |
| ***B64F 5/10*** | (2017.01) |
| *B21J 15/10* | (2006.01) |
| *B21J 15/14* | (2006.01) |
| *B21J 15/42* | (2006.01) |

(52) U.S. Cl.

CPC ................ *B23B 41/16* (2013.01); *B64F 5/10* (2017.01); *B21J 15/10* (2013.01); *B21J 15/142* (2013.01); *B21J 15/42* (2013.01); *B23B 2215/04* (2013.01); *Y10T 408/561* (2015.01); *Y10T 408/5626* (2015.01); *Y10T 408/56245* (2015.01)

(58) Field of Classification Search

CPC .......... B21J 15/142; B21J 15/10; B21J 15/42; B23B 2215/04; B23Q 1/766; Y10T 408/561; Y10T 408/5626; Y10T 408/56245

See application file for complete search history.

(56) References Cited

U.S. PATENT DOCUMENTS 1,495,085 A * 5/1924 Lake ........................ B23B 29/24 29/57
3,646,660 A * 3/1972 Sheffer, Jr. ............... B21J 15/02 29/243.53

(Continued)

*Primary Examiner* — Daniel Howell
*Assistant Examiner* — Yasir Diab
(74) *Attorney, Agent, or Firm* — Armstrong Teasdale LLP

(57) ABSTRACT

A reaction tool for forming openings in an aircraft fuselage joint is provided. The joint includes (i) a first side from which a forming tool is to be applied at a plurality of opening locations and (ii) an opposing second side. The reaction tool includes a plurality of connectors configured to couple to the joint second side, and a reaction bar coupled to the plurality of connectors. The reaction bar is configured to extend across the plurality of opening locations. The reaction tool also includes a plurality of reaction members coupled to the reaction bar. Each of the reaction members includes a clamping surface configured to couple to the joint second side such that each clamping surface at least partially surrounds a corresponding one of the plurality of opening locations.

24 Claims, 10 Drawing Sheets

12
14
10
104
154
152,352
356
140
336
130,330
332
338
152,352
101,301
158,358
116
356
359
156
100
128
106
118
106
364
114
120
354
102
357
360
362
118
357
360
360
360
354
124
112
144,344
110
366
124

(56) References Cited

U.S. PATENT DOCUMENTS

| | | | | |
|---|---|---|---|---|
| 4,521,140 | A * | 6/1985 | Doescher | B23B 47/287<br>408/108 |
| 5,383,751 | A * | 1/1995 | Wheetley | B23B 39/00<br>408/1 R |
| 6,210,084 | B1 | 4/2001 | Banks et al. | |
| 6,905,291 | B2 | 6/2005 | Day et al. | |
| 7,942,614 | B2 * | 5/2011 | Duran | B23B 49/02<br>408/1 R |
| 8,002,503 | B2 * | 8/2011 | Gamboa | B23Q 11/0046<br>408/1 R |
| 8,413,307 | B2 * | 4/2013 | Katzenberger | B21J 15/10<br>29/240 |
| 8,567,722 | B2 | 10/2013 | Rosman et al. | |
| 2005/0260051 | A1 * | 11/2005 | Hamann | B23Q 1/035<br>409/131 |
| 2011/0265300 | A1 | 11/2011 | Bense et al. | |
| 2013/0341847 | A1 * | 12/2013 | Bense | B64F 5/0009<br>269/21 |

* cited by examiner

REACTION TOOL AND METHOD FOR FORMING OPENINGS IN AN AIRCRAFT FUSELAGE JOINT

BACKGROUND

The field of the disclosure relates generally to forming openings through a plurality of components, and, more particularly, to tools and methods for forming openings through a plurality of components with reduced interlaminate burring and debris.

Many structures, such as but not limited to aircraft, include components that are coupled together by fasteners inserted through cooperating openings formed in overlapping portions of the components. At least some such cooperating openings are formed by aligning the components for coupling and forming the openings, such as by drilling, through the successive layers of each component. However, the forming tool, such as a drill, tends to push the layers apart as it moves through the components, resulting in burrs around the openings in the internal layers and/or loose debris between the layers. The components must then be uncoupled to clean up the interlaminate burrs and debris, and re-aligned for insertion of the fasteners, resulting in an increased cycle time and cost for the component join process.

Moreover, while it is known to attempt to clamp the layers of the components together to reduce interlaminate burring and debris during forming of the openings, at least some such known clamping methods are unsatisfactory. For example, at least some known clamping methods rely on a tool coupled to an adjacent opening to apply a reaction force to each opening forming area. However, a large number of time-consuming tool installations are needed to cover each forming area. For another example, at least some known clamping methods rely on a magnetic clamp. However, the use of magnets increases a complexity and expense of the clamping system and provides an insufficient clamping force as a thickness of the components increases.

BRIEF DESCRIPTION

In one aspect, a reaction tool for forming openings in an aircraft fuselage joint is provided. The joint includes (i) a first side from which a forming tool is to be applied at a plurality of opening locations and (ii) an opposing second side. The reaction tool includes a plurality of connectors configured to couple to the joint second side, and a reaction bar coupled to the plurality of connectors. The reaction bar is configured to extend across the plurality of opening locations. The reaction tool also includes a plurality of reaction members coupled to the reaction bar. Each of the reaction members includes a clamping surface configured to couple to the joint second side such that each clamping surface at least partially surrounds a corresponding one of the plurality of opening locations.

In another aspect, a method of making fastener openings at a plurality of opening locations in an aircraft fuselage joint is provided. The joint includes a first side and an opposing second side. The method includes coupling a plurality of clamping surfaces of a reaction tool to the joint second side, such that each clamping surface at least partially surrounds a corresponding one of the plurality of opening locations. The method also includes forming the fastener openings at the plurality of opening locations.

In another aspect, a method of making a reaction tool for forming openings in an aircraft fuselage joint is provided. The joint includes (i) a first side from which a forming tool is to be applied at a plurality of opening locations and (ii) an opposing second side. The method includes coupling a plurality of reaction members to a reaction bar. The reaction bar is configured to extend across the plurality of opening locations. Each of the reaction members includes a clamping surface configured to couple to the joint second side such that each clamping surface at least partially surrounds a corresponding one of the plurality of opening locations. The method also includes coupling a plurality of connectors to the reaction bar. Each of the plurality of connectors is configured to couple to the joint second side.

The features, functions, and advantages that have been discussed can be achieved independently in various embodiments or may be combined in yet other embodiments further details of which can be seen with reference to the following description and drawings.

DETAILED DESCRIPTION

Embodiments of the tools and methods described herein provide a reaction tool having a reaction bar that extends across a plurality of opening locations in a joint between a plurality of overlapping components. The embodiments also provide a plurality of reaction members coupled to the reaction bar. Each reaction member includes a clamping surface that at least partially surrounds a corresponding one of the plurality of opening locations while openings are formed at the opening locations. Thus, overlapping portions of the components are maintained in face-to-face coupled relationship along the joint during the process of forming the openings, reducing or eliminating interlaminate burring and debris.

Unless otherwise indicated, approximating language, such as "generally" and "substantially," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. For example, reference to a "second" item does not require or preclude the existence of a "first" or lower-numbered item, or of a "third" or higher-numbered item.

Figure 8:
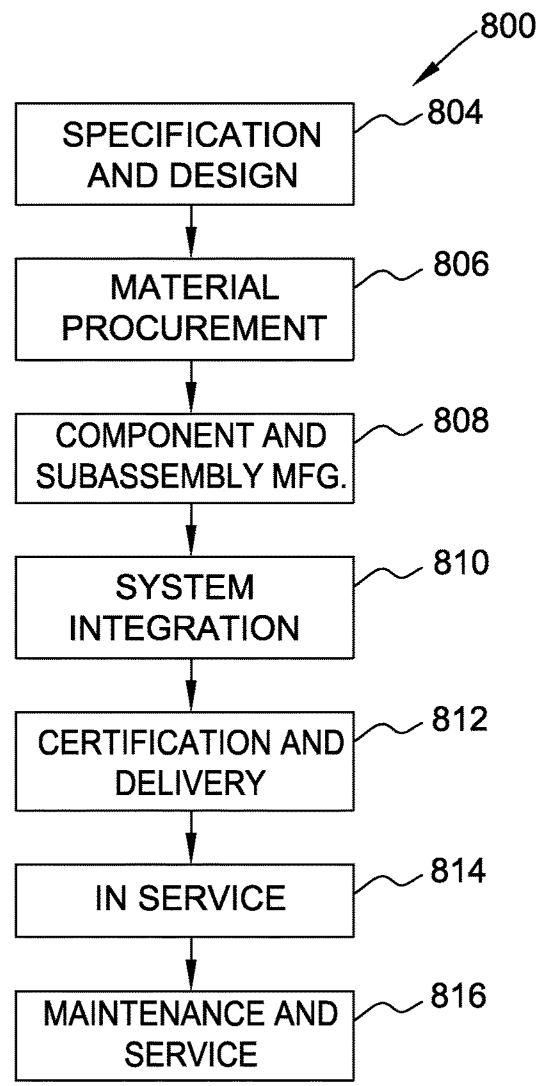
FIG. 8 is a flow diagram of an exemplary aircraft production and service methodology.
Figure 9:
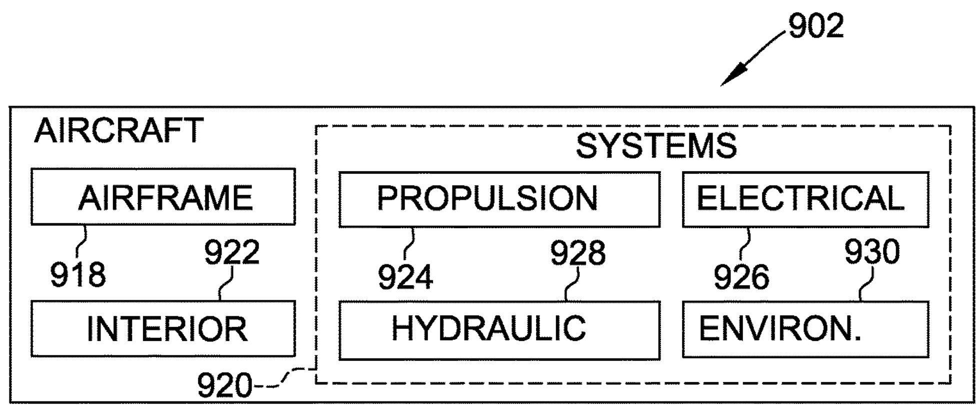
FIG. 9 is a schematic view of an exemplary aircraft.

Referring more particularly to the drawings, embodiments of the disclosure may be described in the context of an exemplary aircraft manufacturing and service method 800 as shown in FIG. 8 and an exemplary aircraft 902 as shown in FIG. 9. It should be understood, however, that although an aerospace example is shown, the principles of the disclosure may be applied to other structures virtually without limitation. Non-limiting examples of such other structures include a maritime structure, an automotive structure, an energy industry structure (such as, for example, a structure associated with solar energy or wind energy production), and a consumer or household structure.

Figure 1:
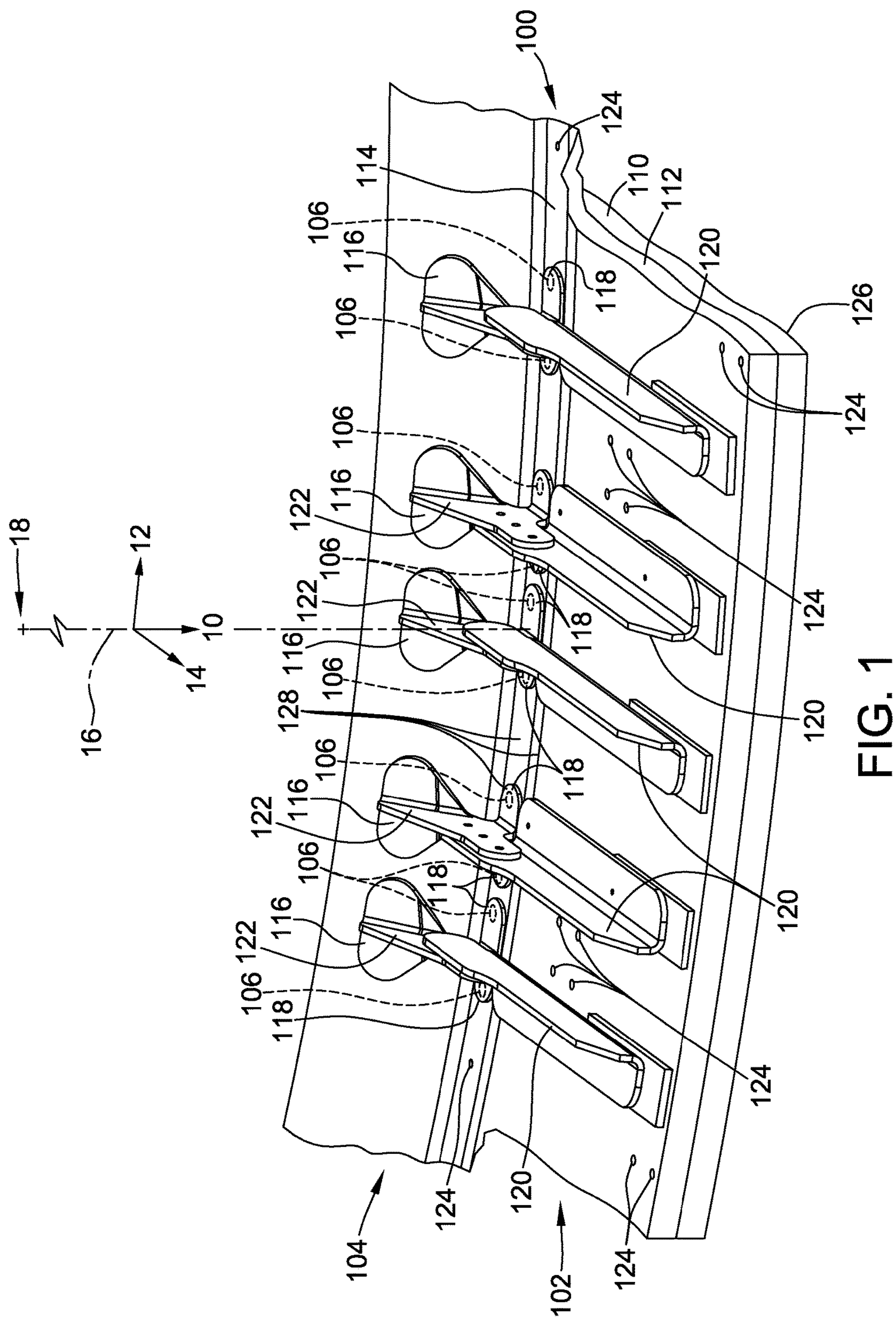
FIG. 1 is a schematic perspective interior view of an exemplary embodiment of a portion of a fuselage joint that may be used with the exemplary aircraft shown in FIG. 9.

FIG. 1 is a schematic perspective interior view of an exemplary embodiment of a portion of a fuselage joint 100 that may be part of the exemplary aircraft 902 shown in FIG. 9. More specifically, a first fuselage section 102 and a second fuselage section 104 are configured to overlap at joint 100, which extends circumferentially about airframe 918. Thus, joint 100 defines a closed, generally curved shape, only a portion of which is visible in FIG. 1. An axial direction 14 is defined parallel to an axis 16 through a center 18 of the curved shape, a radial direction 10 is defined on a line through each point on joint 100 from center 18, and a circumferential direction 12 is defined tangent to a perimeter of the curved shape. First fuselage section 102 and second fuselage section 104 are configured to be joined by fasteners 1004 (shown in FIG. 10) inserted at each of a plurality of fastener openings 1006 along joint 100. Each fastener opening 1006 extending in radial direction 10 must be formed at each of a plurality of opening locations 106 to accommodate fasteners 1004.

More specifically, in the illustrated embodiment, opening 1006 formed at each opening location 106 must extend through an outer skin 110 of first section 102, a splice strap 112 coupled to first section 102, a T-chord 114 of second section 104, and a circumferential flange 118 of one of a plurality of T-clips 116 coupled to second section 104. In certain embodiments, outer skin 110 and splice strap 112 are formed from a fiber-reinforced composite material, while T-chord 114 and T-clips 116 are formed from a metal material, such as but not limited to titanium. Alternatively, each of outer skin 110, splice strap 112, T-chord 114, and T-clips 116 are formed from any suitable material that enables joint 100 to function as described herein. Moreover, in some embodiments, at least one shim, such as a fiberglass shim (not shown), is positioned between at least one adjacent pair of outer skin 110, splice strap 112, T-chord 114, and T-clips 116. It should be understood that, in alternative embodiments, each of first fuselage section 102 and second fuselage section 104 includes overlapping components at joint 100 other than, or in addition to, outer skin 110, splice strap 112, T-chord 114, and T-clips 116.

In the illustrated embodiment, joint 100 also includes a plurality of splice angles 120 coupled to first fuselage section 102. A portion of each splice angle 120 is positioned adjacent a radially extending flange 122 of a corresponding T-clip 116. Additional fasteners (not shown) are inserted through each splice angle 120 and corresponding T-clip radial flange 122 to further securely couple first fuselage section 102 and second fuselage section 104. In alternative embodiments, joint 100 does not include splice angles 120.

In the illustrated embodiment, joint 100 further includes a plurality of auxiliary openings 124 each defined in at least one of first fuselage section 102 and second fuselage section 104. It should be understood that in alternative embodiments, auxiliary openings 124 are positioned in additional and/or alternative locations other than the particular locations illustrated in FIG. 1. In certain embodiments, at least one auxiliary opening 124 is pre-formed in joint 100 for an ultimate purpose other than use with reaction tool 101. Additionally or alternatively, at least one auxiliary opening 124 is formed solely for use with reaction tool 101. In other alternative embodiments, joint 100 does not include auxiliary openings 124.

Figure 10:
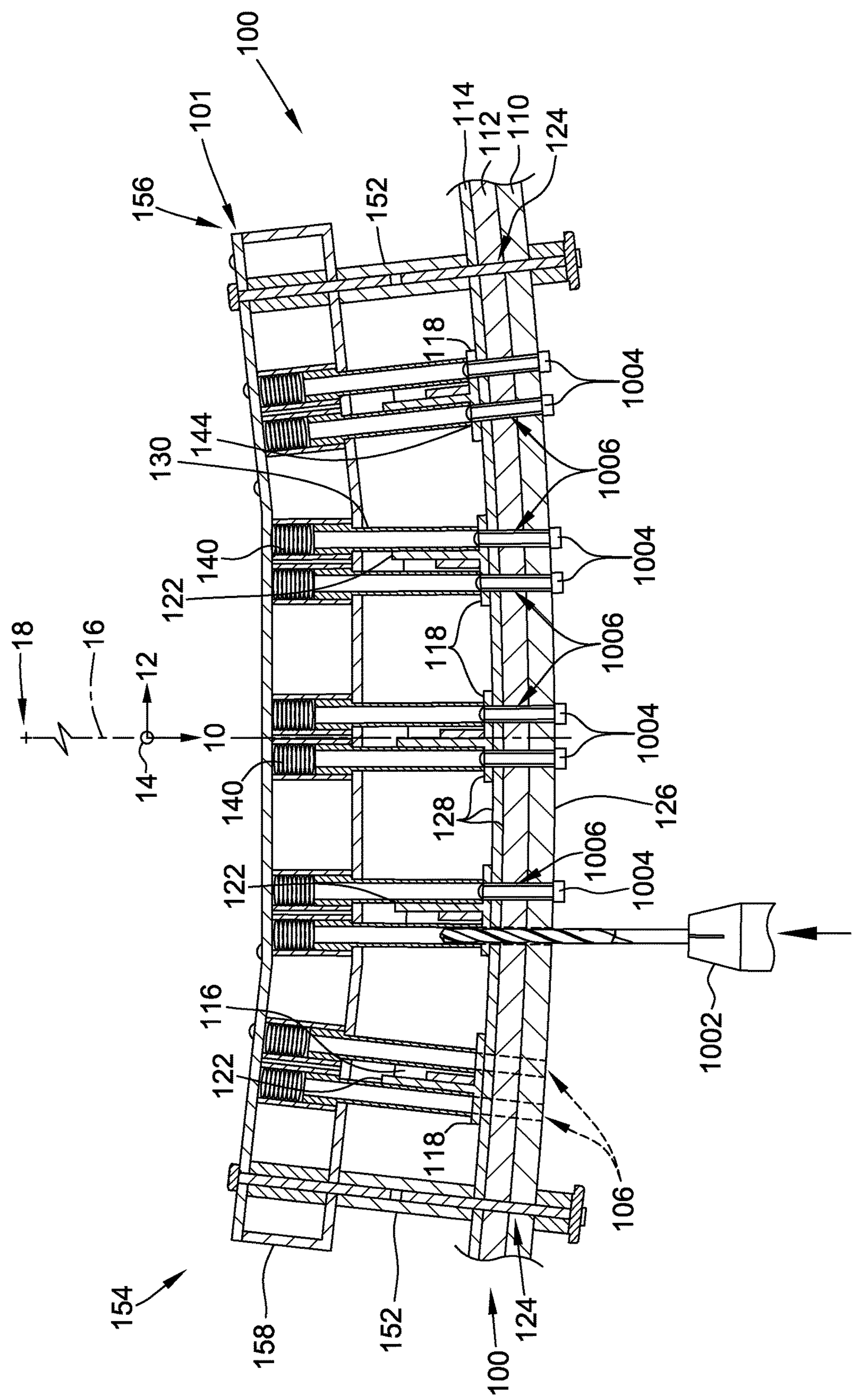
FIG. 10 is a schematic section view of an exemplary forming tool applied to the exemplary fuselage joint shown in FIG. 1.

In certain embodiments, with reference also to FIG. 10, openings 1006 are formed at each opening location 106, such as by positioning first fuselage section 102 and second fuselage section 104 for coupling as shown in FIG. 1 and forming opening 1006 at each location 106 through the aligned overlapping layers of first fuselage section 102 and second fuselage section 104. For example, but not by way of limitation, forming tool 1002, such as a power drill, is positioned radially outwardly from outer skin 110 at each opening location 106 and pushed through outer skin 110, splice strap 112, T-chord 114, T-clip 116, and any other intervening layers, such as but not limited to a shim, to form each opening 1006.

Figure 2:
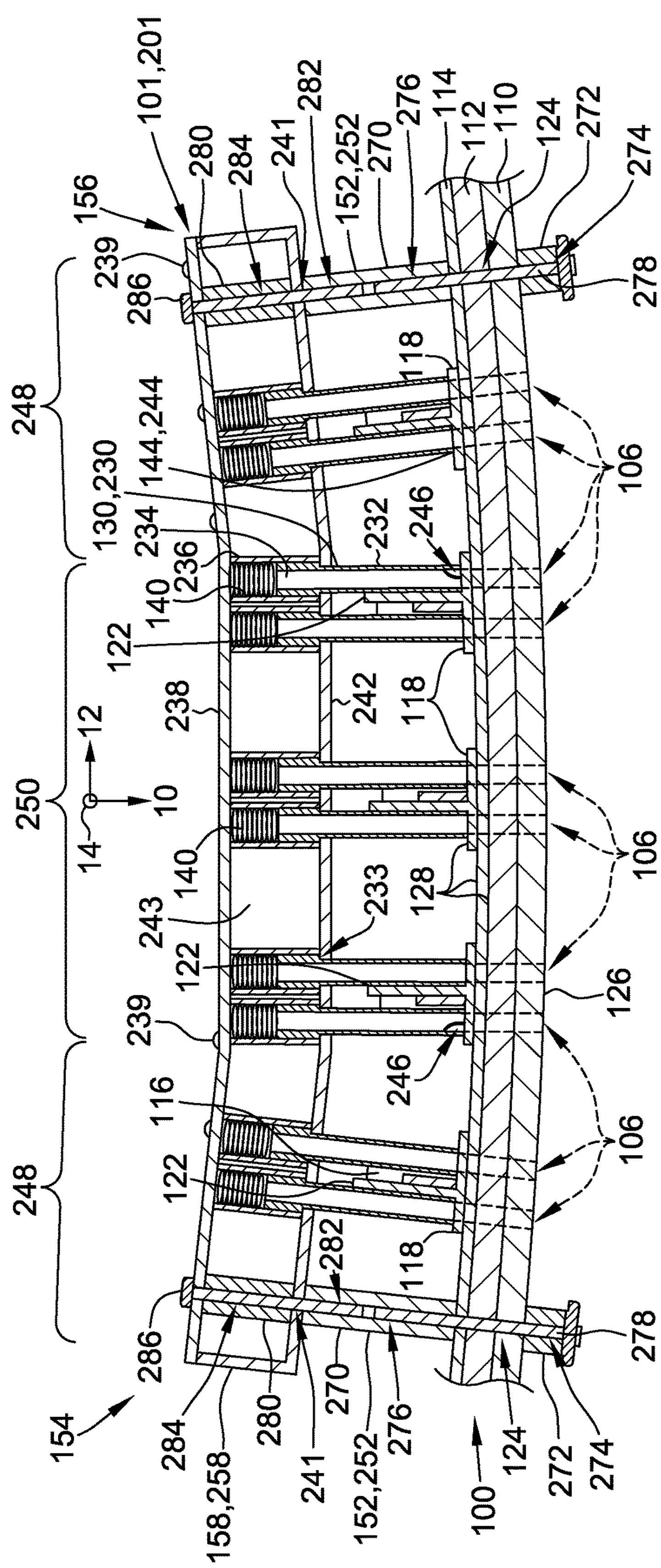
FIG. 2 is a schematic section view of a first exemplary embodiment of a reaction tool coupled to the exemplary fuselage joint shown in FIG. 1.

FIG. 2 is a schematic section view of a first exemplary embodiment of a reaction tool 101 coupled to fuselage joint 100. Reaction tool 101 is configured to react a force applied by a forming tool 1002 (shown in FIG. 10), such as a drill, as it moves radially through opening location 106. Reaction tool 101 facilitates maintaining the layers of first fuselage section 102 and second fuselage section 104 in face-to-face coupled relationship along joint 100 during the forming process to reduce or eliminate interlaminate burring and debris.

In the illustrated embodiment, forming tool 1002 is configured to be applied from a first side 126 of joint 100, such as a radially outer side, through opening locations 106 in a radially inward direction, and reaction tool 101 is configured to be coupled to an opposing second side 128 of joint 100, such as a radially inner side. In the illustrated embodiment, joint first side 126 is defined by a radially outer surface of outer skin 110, and joint second side 128 is defined by at least one of a radially inner surface of T-clip circumferential flanges 118, a radially inner surface of T-chord 114, and a radially inner surface of splice strap 112. In alternative embodiments, each of joint first side 126 and opposing joint second side 128 is defined by any suitably positioned component of joint 100. In particular, in certain alternative embodiments, joint second side 128 is the radially outer side of joint 100, and joint first side 126 is the radially inner side.

Reaction tool 101 includes a reaction bar 158 that extends from a first end 154 to a second end 156. First end 154 and second end 156 are configured to be positioned such that reaction bar 158 extends circumferentially along at least a portion of joint 100, and such that reaction bar 158 extends across a plurality of opening locations 106. In the exemplary embodiment, reaction bar 158 extends across ten opening locations 106 disposed on five T-clips 116, with each pair of opening locations 106 extending through a pair of circumferential flanges 118 of a corresponding T-clip 116. In alternative embodiments, reaction bar 158 extends across any suitable number of opening locations 106 disposed on any suitable portion of joint second side 128.

Reaction tool 101 also includes a plurality of reaction members 130 coupled to reaction bar 158. Each reaction member 130 includes a clamping surface 144 that is configured to couple to joint second side 128 at a location that at least partially surrounds a corresponding opening location 106 during application of forming tool 1002, and to transfer the reacted force from the opening location 106 to reaction bar 158. Moreover, each reaction member 130 is configured to receive forming tool 1002, such as a drill, as it extends from joint first side 126 through joint second side 128 at opening location 106 during the forming process. Thus, reaction members 130 are at reduced risk of damage from contact with forming tool 1002. In certain embodiments, each reaction member 130 is coupled to reaction bar 158 through a biasing member 140 that facilitates reacting the forces applied by forming tool 1002.

Reaction tool 101 further includes a plurality of connectors 152 configured to removably couple reaction tool 101 to joint 100. In certain embodiments, connectors 152 are configured to securely couple reaction tool 101 to joint 100 such that reaction bar 158 is capable of reacting the forces applied by forming tool 1002. For example, in some embodiments, connectors 152 are configured to removably couple reaction bar 158 to auxiliary openings 124 of joint 100.

In the particular exemplary embodiment illustrated in FIG. 2, reaction tool 101 is designated as reaction tool 201, reaction members 130 are designated as reaction members 230, clamping surfaces 144 are designated as clamping surfaces 244, reaction bar 158 is designated as reaction bar 258, and connectors 152 are designated as connectors 252. Connectors 252 of reaction tool 201 are configured to couple to respective auxiliary openings 124 of joint 100 that each extend through outer skin 110, splice strap 112, and T-chord 114. In the illustrated embodiment, connectors 252 include two connectors 252 disposed proximate opposite ends 154 and 156 of reaction bar 258, and each connector 252 is configured to couple to a corresponding auxiliary opening 124 that is circumferentially aligned with opening locations 106. Additionally in the illustrated embodiment, each auxiliary opening 124 to which connectors 252 couple is disposed adjacent a respective circumferentially outer opening location 106 of the ten covered opening locations 106. In alternative embodiments, reaction tool 201 includes any suitable number of connectors 252, each positioned at any suitable location between first end 154 and second end 156 of reaction bar 258 that is aligned with a suitable auxiliary opening 124.

In the illustrated embodiment, each connector 252 includes a standoff 270, a bushing mount 272, and a block 280. An opening 274 defined through bushing mount 272 is configured to align with auxiliary opening 124 and a first opening 276 defined in standoff 270. Aligned openings 274, 124 and 276 are configured to receive a mounting fastener 278 to removably couple standoff 270 to joint second side 128. In alternative embodiments, connectors 252 include any suitable structure that enables connector 252 to couple to joint second side 128. Further in the illustrated embodiment, an opening 284 defined through block 280 is configured to align with a second opening 282 defined in standoff 270. Aligned openings 284 and 282 are configured to receive a standoff fastener 286 to removably couple standoff 270 to reaction bar 258. A bottom wall 242 of reaction bar 258 includes openings 241 through which fasteners 286 extend.

In certain embodiments, block 280 is slidably positionable within reaction bar 258 and openings 241 are slotted, such that a circumferential position of connector 252 is adjustable to accommodate different locations of auxiliary openings 124, for example at different circumferential locations along joint 100. Reaction bar 258 includes any suitable structure configured to maintain each block 280 at the selected circumferential position.

Also in the illustrated embodiment, each reaction member 230 includes a piston 232 that extends between a piston head 234 and an oppositely disposed clamping surface 244. Piston head 234 is disposed within reaction bar 258, and each piston 232 extends through an opening 233 in bottom wall 242. As described above, clamping surface 244 is configured to couple to joint second side 128 at a location that at least partially surrounds a corresponding opening location 106, and to transfer the reacted force from the opening location 106 through piston 232 to reaction bar 258. Piston 232 is further configured proximate clamping surface 244 such that forming tool 1002 (shown in FIG. 10), such as a drill, is receivable within piston 232 as it extends through joint second side 128 at opening location 106 during the forming process. For example, in the illustrated embodiment, piston 232 has a generally tubular shape between clamping surface 244 and piston head 234, and the inner diameter of the tubular shape is sufficiently large to accommodate a drill bit used to form openings at opening locations 106. In alternative embodiments, piston 232 has a generally tubular shape proximate clamping surface 244 and transitions to a generally solid shape proximate piston head 234. In other alternative embodiments, piston 232 has any suitable configuration that enables piston 232 to function as described herein.

In the illustrated embodiment, each piston 232 includes a window 246 proximate clamping surface 244. Window 246 is configured to permit a user to verify, for example via direct sight or a camera, that clamping surface 244 is properly positioned around the corresponding opening location 106. For example but not by way of limitation, window 246 is formed by cutting a portion of material from a half-perimeter of clamping surface 244. In alternative embodiments, at least one piston 232 does not include window 246.

Further in the illustrated embodiment, reaction bar 258 includes a top wall 238 opposite bottom wall 242, Top wall 238 is removably coupled to reaction bar 258. For example, top wall 238 is coupled to reaction bar 258 using a plurality of removable fasteners 239. A pair of side walls 243 (only one of which is visible in the section view of FIG. 2) extend between bottom wall 242 and top wall 238. Bottom wall 242, top wall 238, and side walls 243 cooperate to form a hollow reaction bar 258 with a generally rectangular cross-section. In the illustrated embodiment, piston head 234 is disposed within a generally tubular piston holder 236, and piston holder 236 is disposed within reaction bar 258. Biasing member 140, for example but not by way of limitation a helical spring, is coupled within piston holder 236 at a radial position, with respect to radial direction 10, between piston head 234 and top wall 238. Biasing member 140 is configured to react against top wall 238 such that biasing member 140 urges piston head 234 in a radially outward direction towards reaction bar bottom wall 242, and thereby urges clamping surface 244 of piston 232 against joint second side 128. Because reaction bar 258 is coupled to joint 100 by a plurality of connectors 252 at auxiliary openings 124 spaced apart from opening locations 106, the bias of clamping surface 244 against joint second side 128 is substantially maintained as forming tool 1002 moves through each opening location 106, thereby maintaining layers 110, 112, 114, and 118 of joint 100 in close proximity and reducing or eliminating interlaminate burring and debris.

In certain embodiments, at least one piston holder 236 is slidably positionable within reaction bar 258 and a corresponding at least one opening 233 is slotted, such that a circumferential position of at least one reaction member 230 is adjustable to facilitate aligning the reaction members 230 with the opening locations 106. For example, a distance between opening locations 106 is not constant at different circumferential locations along joint 100, and the circumferential position of at least one reaction member 230 within reaction tool 201 is adjustable such that reaction members 230 are alignable with the differently spaced opening locations 106 at the different circumferential locations along joint 100. For example, to adjust the circumferential position of reaction members 230 in certain embodiments, top wall 238 is uncoupled from reaction bar 258, each piston holder 236 is moved to a selected circumferential position within reaction bar 258, the corresponding piston 232 and biasing member 140 are inserted within each piston holder 236, and then top wall 238 is securely coupled to reaction bar 258. Additionally or alternatively, top wall 238 includes at least one slot (not shown) through which a tool, such as but not limited to an allen key, is insertable into each piston head 234 to loosen the corresponding piston 232 to enable minor adjustments of circumferential position. In alternative embodiments, reaction bar 258 includes any suitable structure configured to maintain each piston holder 236 at the selected circumferential position.

Additionally, in some embodiments, reaction tool 101 is configured to accommodate a curvature of joint 100. More specifically, reaction tool 101 is configured such that clamping surfaces 144 cooperate to present a profile that is complementary to the curvature of joint 100. In alternative embodiments, reaction tool 101 is not configured to accommodate a curvature of joint 100. For example, but not by way of limitation, reaction tool 101 is configured to extend across only three T-clips 116, and the curvature of joint 100 along the three T-clips 116 is sufficiently small to enable reaction tool 101 having clamping surfaces 144 disposed in a substantially flat profile to react the forces from forming tool 1002 at each opening location 106. Notably, in embodiments in which reaction tool 101 is configured to accommodate a curvature of joint 100, reaction tool 101 can be applied effectively to a greater number of T-clips 116 as compared to a reaction tool with a flat profile.

In the embodiment of FIG. 2, reaction bar 258 includes a substantially flat central portion 250, and angled portions 248 proximate each end 154 and 156. Each angled portion 248 is configured to extend across a respective circumferentially outer T-clip 116 of the T-clips 116 covered by reaction bar 258. Reaction members 230 extending from each angled portion 248 extend obliquely relative to reaction members extending from central portion 250 of reaction bar 258, such that clamping surfaces 144 cooperate to present a profile that is complementary to the curvature of joint 100. Forming reaction bar 258 having at least one angled portion 248 enables reaction tool 201 to accommodate a curvature of joint 100 using a combination of components that are relatively simple to manufacture. In alternative embodiments, reaction bar 258 has another suitable shape, for example but not by way of limitation a continuously curved shape, such that clamping surfaces 144 cooperate to present a profile that approximates the curvature of joint 100.

Figure 3:
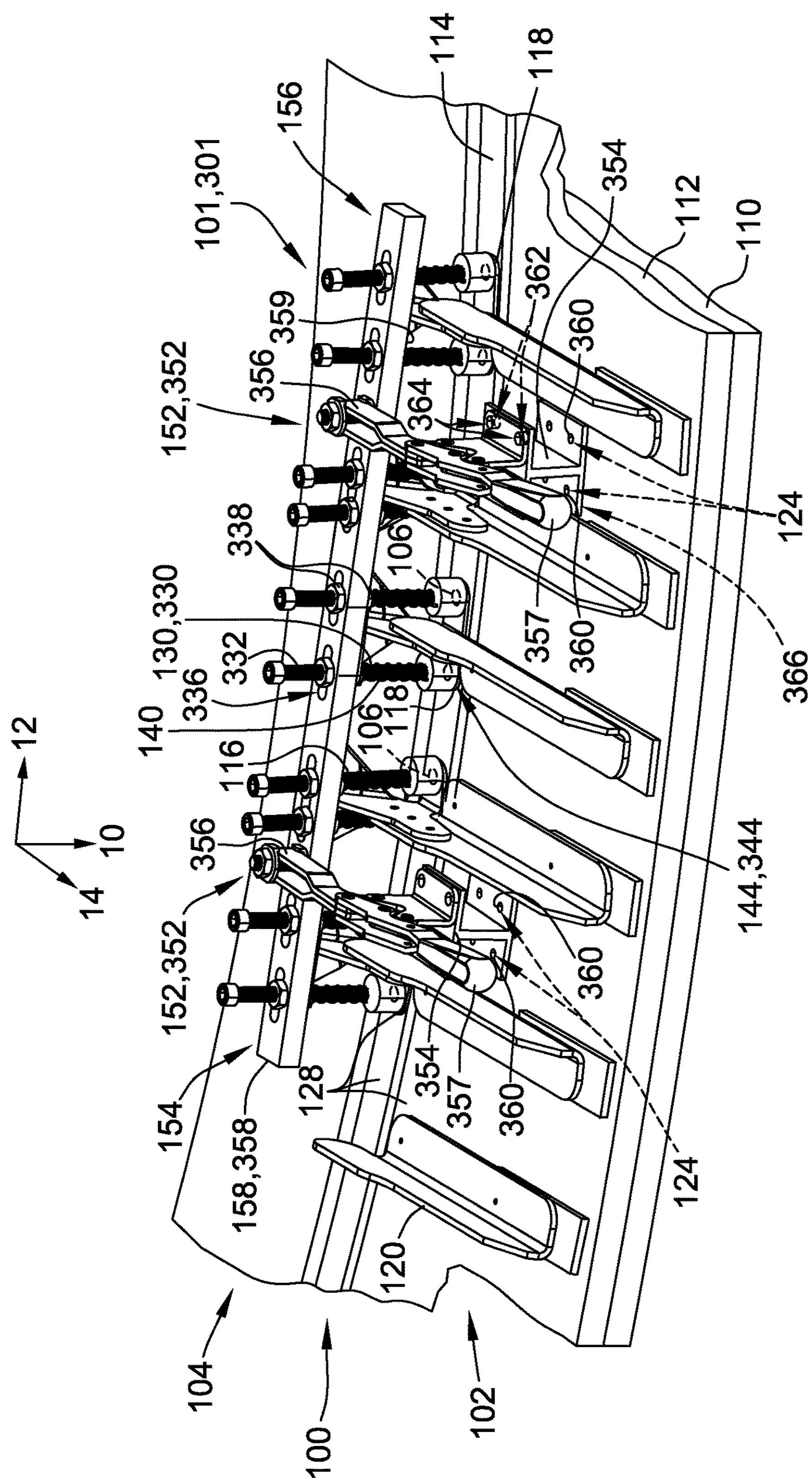
FIG. 3 is a schematic perspective view of a second exemplary embodiment of a reaction tool coupled to the exemplary fuselage joint shown in FIG. 1.

FIG. 3 is a schematic perspective view of a second exemplary embodiment of reaction tool 101 coupled to fuselage joint 100. In the particular exemplary embodiment illustrated in FIG. 3, reaction tool 101 is designated as reaction tool 301, reaction members 130 are designated as reaction members 330, clamping surfaces 144 are designated as clamping surfaces 344, reaction bar 158 is designated as reaction bar 358, and connectors 152 are designated as connectors 352. Connectors 352 of reaction tool 301 are each configured to couple to auxiliary openings 124 of joint 100 that each extend through outer skin 110 and splice strap 112. In the illustrated embodiment, connectors 352 include two connectors 352 disposed proximate opposite ends 154 and 156 of reaction bar 358, and each connector 352 is configured to couple to a corresponding plurality of auxiliary openings 124 that are axially offset with respect to opening locations 106. In alternative embodiments, reaction tool 301 includes any suitable number of connectors 352, each positioned at any suitable location between first end 154 and second end 156 of reaction bar 358, that enables reaction tool 301 to function as described herein.

In the illustrated embodiment, each connector 352 includes a base 354, a connector clamp 356, and a connector clamp actuator 357. For example, in the illustrated embodiment, each base 354 is an I-block. In alternative embodiments, base 354 has any suitable structure that enables connectors 352 to function as described herein.

A radially outer contact surface 366 of each base 354 is configured to couple against splice strap 112. A plurality of mounting openings 360 defined through base 354 is configured to align with a respective plurality of auxiliary openings 124. Aligned openings 360 and 124 are configured to receive fasteners (not visible) to removably couple base 354 to joint second side 128. In alternative embodiments, connectors 352 include any suitable structure that enables connector 352 to couple to joint second side 128. Further, in the illustrated embodiment, a plurality of connector openings 362 defined through base 354 is configured to align with a corresponding plurality of openings 364 defined in connector clamp 356. Aligned openings 362 and 364 are configured to receive fasteners (not visible) to removably couple base 354 to connector clamp 356. In alternative embodiments, rather than each connector clamp 356 being coupled directly to a corresponding base 354, a plurality of bases 354 are coupled together by a member (not shown) that extends circumferentially parallel to joint 100, and each of the plurality of connector clamps 356 is coupled to the circumferentially extending member.

Each connector clamp 356 is operatively coupled to reaction bar 358. More specifically, when connector clamp actuator 357 is moved from a disengaged position to an engaged position, connector clamp 356 exerts a force on reaction bar 358 in radial direction 10 such that reaction bar 358 is urged towards opening locations 106. For example, in the illustrated embodiment, each connector clamp 356 is a suitable off-the-shelf toggle clamp and each connector clamp actuator 357 is a hand-operable lever integral with the toggle clamp. In alternative embodiments, base 354 has any suitable structure that enables connectors 352 to function as described herein.

In the illustrated embodiment, each reaction member 330 includes a piston 332 coupled to reaction bar 358. In the illustrated embodiment, each piston 332 has a generally solid cylindrical shape. For example, but not by way of limitation, each piston 332 is a threaded bolt. In alternative embodiments, each piston 332 has any suitable structure that enables reaction tool 301 to function as described herein. A foot 334 is disposed at an end of each piston 332 opposite reaction bar 358, and clamping surface 344 is disposed at an end of each foot 334 opposite reaction bar 358. As described above, each clamping surface 344 is configured to couple to joint second side 128 at a location that at least partially surrounds a corresponding opening location 106, and to transfer the reacted force from the opening location 106 through reaction member 330 to reaction bar 358. Each foot 334 is configured such that forming tool 1002 (shown in FIG. 10), such as a drill, is receivable within foot 334 as forming tool 1002 extends through joint second side 128 at opening location 106 during the forming process. For example, in the illustrated embodiment, foot 334 has a generally tubular shape, and the inner diameter of the tubular shape is sufficiently large to accommodate a drill bit used to form openings 1006 (shown in FIG. 10) at opening locations 106. In alternative embodiments, foot 334 has any suitable configuration that enables reaction member 330 to function as described herein. In certain embodiments, each foot 334 includes a window (not shown) proximate clamping surface 344, similar to window 246 described above for piston 232.

In the illustrated embodiment, reaction bar 358 is formed from a solid bar having a generally rectangular cross-section. Thus, reaction bar 358 is relatively simple to manufacture as compared to certain other embodiments of reaction bar 158. In alternative embodiments, reaction bar 358 has any suitable structure that enables reaction bar 358 to function as described herein. In the illustrated embodiment, pistons 332 extend through at least one opening 336 defined in reaction bar 358, and each piston 332 is coupled to reaction bar 358 by a pair of oppositely disposed threaded nuts 338. Threaded nuts 338 are repositionable along piston 332 to enable adjustment of a radial position of piston 332 relative to reaction bar 358. In alternative embodiments, pistons 332 are coupled to reaction bar 358 in any suitable fashion that enables pistons 332 to function as described herein.

In the illustrated embodiment, at least one opening 336 is slotted, and at least one piston 332 is slidably positionable in the at least one opening 336 such that a circumferential position of at least one reaction member 330 is adjustable to facilitate aligning the reaction members 330 with the opening locations 106. In the illustrated embodiment, threaded nuts 338 are adjustable to releasably lock each piston 332 at the selected circumferential positions. In alternative embodiments, reaction tool 301 includes any suitable structure configured to maintain each reaction member 330 at the selected circumferential position. In other alternative embodiments, none of pistons 332 is slidably positionable in at least one opening 336.

Biasing member 140 of each reaction member 330, for example but not by way of limitation a helical spring, is disposed around piston 332 at a position between reaction bar 358 and foot 334, with respect to radial direction 10. Biasing member 140 is configured to react against a radially outer surface 359 of reaction bar 358 such that biasing member 140 urges clamping surface 344 of foot 334 against joint second side 128. Because reaction bar 358 is coupled to joint 100 by a plurality of connectors 352 at auxiliary openings 124 spaced apart from opening locations 106, the bias of clamping surface 344 against joint second side 128 is substantially maintained as forming tool 1002 moves through each opening location 106, thereby maintaining layers 110, 112, 114, and 118 of joint 100 in close proximity and reducing or eliminating interlaminate burring and debris.

In some embodiments, reaction tool 301 is configured to accommodate a curvature of joint 100, as described above. For example, in the illustrated embodiment, each foot 334 is coupled to the corresponding piston 332 through a suitable swivel connection (not shown). When clamping surfaces 344 are urged against joint second side 128, the swivel mechanism enables each clamping surface 344 to engage flush with a local contour of joint 100 at the respective opening location 106. Additionally or alternatively, contact surface 366 of each base 354 is contoured to cooperate with a local contour of joint 100 at the respective plurality of auxiliary openings 124 to which base 354 is coupled. In other embodiments, reaction tool 301 is not configured to accommodate a curvature of joint 100.

Figure 4:
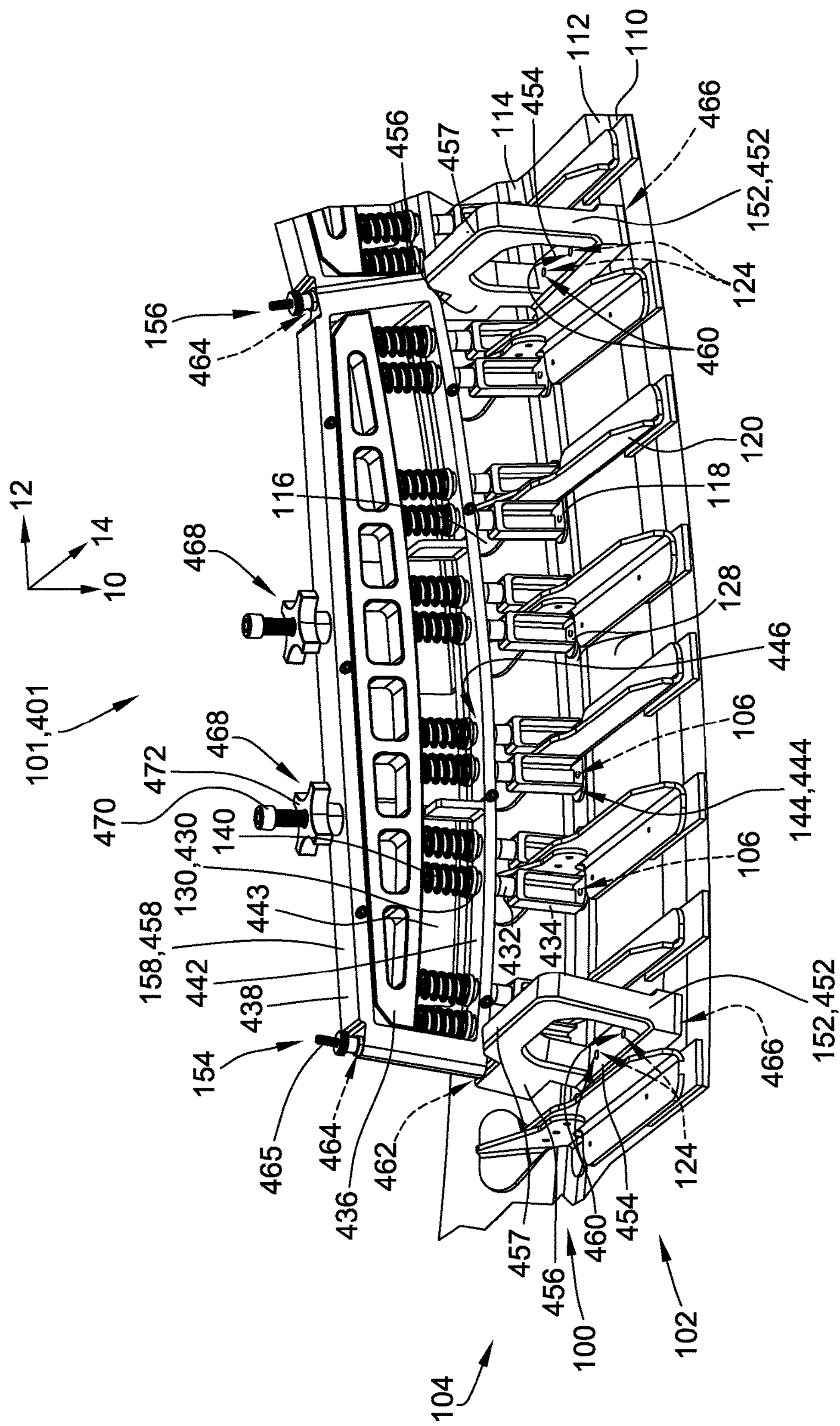
FIG. 4 is a schematic perspective view of a third exemplary embodiment of a reaction tool coupled to the exemplary fuselage joint shown in FIG. 1.

FIG. 4 is a schematic perspective view of a third exemplary embodiment of reaction tool 101 coupled to fuselage joint 100. In the particular exemplary embodiment illustrated in FIG. 4, reaction tool 101 is designated as reaction tool 401, reaction members 130 are designated as reaction members 430, clamping surfaces 144 are designated as clamping surfaces 444, reaction bar 158 is designated as reaction bar 458, and connectors 152 are designated as connectors 452. Connectors 452 of reaction tool 201 are configured to couple to respective auxiliary openings 124 of joint 100 that each extend through outer skin 110 and splice strap 112. In the illustrated embodiment, connectors 452 include two connectors 452 disposed proximate opposite ends 154 and 156 of reaction bar 458, and each connector 452 is configured to couple to a corresponding plurality of auxiliary openings 124 that are axially offset with respect to opening locations 106. In alternative embodiments, reaction tool 401 includes any suitable number of connectors 452, each positioned at any suitable location between first end 154 and second end 156 of reaction bar 458, that enables reaction tool 401 to function as described herein.

In the illustrated embodiment, each connector 452 includes a base 454, a standoff 456, and a handle 457. For example, in the illustrated embodiment, each base 454 is substantially flat, handle 457 is a curved member coupled to base 454, and standoff 456 is integrally formed with handle 457. Handle 457 extends radially inwardly to facilitate handling of connector 452. In alternative embodiments, each connector 452 has any suitable structure that enables connectors 452 to function as described herein.

A radially outer contact surface 466 of each base 454 is configured to couple against splice strap 112. A plurality of mounting openings 460 defined through base 454 is configured to align with a respective plurality of auxiliary openings 124. Aligned openings 460 and 124 are configured to receive fasteners (not visible) to removably couple base 454 to joint second side 128. In alternative embodiments, connectors 452 include any suitable structure that enables connector 452 to couple to joint second side 128. Further in the illustrated embodiment, at least one connector opening 462 defined through each standoff 456 is configured to align with a corresponding at least one opening 464 defined in reaction bar 458. Aligned openings 462 and 464 are configured to receive fasteners 465 to removably couple standoff 456, and thus connector 452, to reaction bar 458. In alternative embodiments, reaction bar 458 is coupled to connectors 452 in any suitable fashion that enables reaction tool 401 to function as described herein.

In the illustrated embodiment, each reaction member 430 includes a piston 432 coupled to reaction bar 458. In the illustrated embodiment, each piston 432 has a generally solid cylindrical shape. In alternative embodiments, each piston 432 has any suitable structure that enables reaction tool 401 to function as described herein. A foot 434 is disposed at an end of each piston 432 opposite reaction bar 458, and clamping surface 444 is disposed at an end of each foot 434 opposite reaction bar 458. As described above, clamping surface 444 is configured to couple to joint second side 128 at a location that at least partially surrounds a corresponding opening location 106, and to transfer the reacted force from the opening location 106 through reaction member 430 to reaction bar 458. Each foot 434 is configured such that forming tool 1002 (shown in FIG. 10), such as a drill, is receivable within foot 434 as forming tool 1002 extends through joint second side 128 at opening location 106 during the forming process. For example, in the illustrated embodiment, foot 434 has a generally U-shaped cross-section along the radial direction 10, and the space within the U-shape is sufficiently large to accommodate a drill bit used to form openings 1006 (shown in FIG. 10) at opening locations 106. Moreover, the U-shaped cross-section of feet 434 facilitates access to opening locations 106 by additional tooling while reaction tool 401 remains coupled to joint 100, thereby facilitating a decreased cycle time for coupling fuselage sections 102 and 104 at joint 100. For example, but not way of limitation, the U-shaped cross-section of feet 434 facilitates installation of fasteners 1004 (shown in FIG. 10) at opening locations 106 after openings 1006 are formed and while reaction tool 401 remains coupled to joint 100. In alternative embodiments, foot 434 has any suitable configuration that enables reaction member 430 to function as described herein.

Further in the illustrated embodiment, reaction bar 458 includes a housing top wall 438 and an oppositely disposed housing bottom wall 442. A pair of side walls 443 (one of which is hidden in FIG. 4 to enable viewing an interior of reaction bar 458) each extend between housing top wall 438 and housing bottom wall 442. For example, each side wall 443 is coupleable to each of bottom wall 442 and top wall 438 using a plurality of removable fasteners (not shown). Housing top wall 438, housing bottom wall 442, and side walls 443 cooperate to form a hollow reaction bar 458 with a generally rectangular cross-section. A strongback 436 is coupled within reaction bar 458 proximate housing top wall 438. Each piston 432 extends into reaction bar 458 through an opening 446 defined in housing bottom 442.

Biasing member 140 of each reaction member 430, for example but not by way of limitation a helical spring, is disposed at a position between strongback 436 and piston 432, with respect to radial direction 10, proximate housing bottom wall 442. Biasing member 140 is configured to react against strongback 436 such that biasing member 140 urges clamping surface 444 of piston 432 against joint second side 128. Because reaction bar 458 is coupled to joint 100 by a plurality of connectors 452 at auxiliary openings 124 spaced apart from opening locations 106, the bias of clamping surface 444 against joint second side 128 is substantially maintained as forming tool 1002 moves through each opening location 106, thereby maintaining layers 110, 112, 114, and 118 of joint 100 in close proximity and reducing or eliminating interlaminate burring and debris.

In certain embodiments (not shown), at least one opening 446 is slotted, and at least one piston 432 is slidably positionable in the at least one opening 446, as described above with respect to opening 336 of reaction tool 301, such that a circumferential position of at least one reaction member 430 is adjustable to facilitate aligning the reaction members 430 with the opening locations 106. In alternative embodiments, none of pistons 432 is slidably positionable in at least one opening 446.

In certain embodiments, reaction bar 458 also includes at least one strongback adjustment mechanism 468. Each strongback adjustment mechanism 468 is operable to position strongback 436 within reaction bar 458 along radial direction 10 such that a force exerted by biasing members 140 on pistons 432 is correspondingly adjusted. For example, in the illustrated embodiment, each strongback adjustment mechanism 468 includes a spring-loaded bolt 470 in threaded communication with an adjustment knob 472. Spring-loaded bolt 470 is coupled to strongback 436, such that operation of knob 472 adjusts a radial position of strongback 436. The adjusted radial position of strongback 436 adjusts a compression of, and thus a force exerted by, biasing members 140. In alternative embodiments, strongback adjustment mechanism 468 includes any suitable structure that enables strongback adjustment mechanism 468 to function as described herein. In other alternative embodiments, reaction bar 458 does not include strongback adjustment mechanism 468.

In some embodiments, reaction tool 401 is configured to accommodate a curvature of joint 100, as described above. For example, in the illustrated embodiment, a bottom of strongback 436 and housing bottom wall 442 each are contoured in the circumferential direction to approximate the curvature of joint 100. Thus, at least some of reaction members 430 extending from strongback 436 through housing bottom wall 442 are not parallel to others of reaction members 430, but rather each reaction member 430 extends at a relative angle such that clamping surface 444 engages flush with a local contour of joint 100 at the respective opening location 106. In alternative embodiments, reaction tool 401 has any other suitable structure that enables reaction tool 401 to accommodate a curvature of joint 100. In other alternative embodiments, reaction tool 401 is not configured to accommodate a curvature of joint 100.

Figure 5:
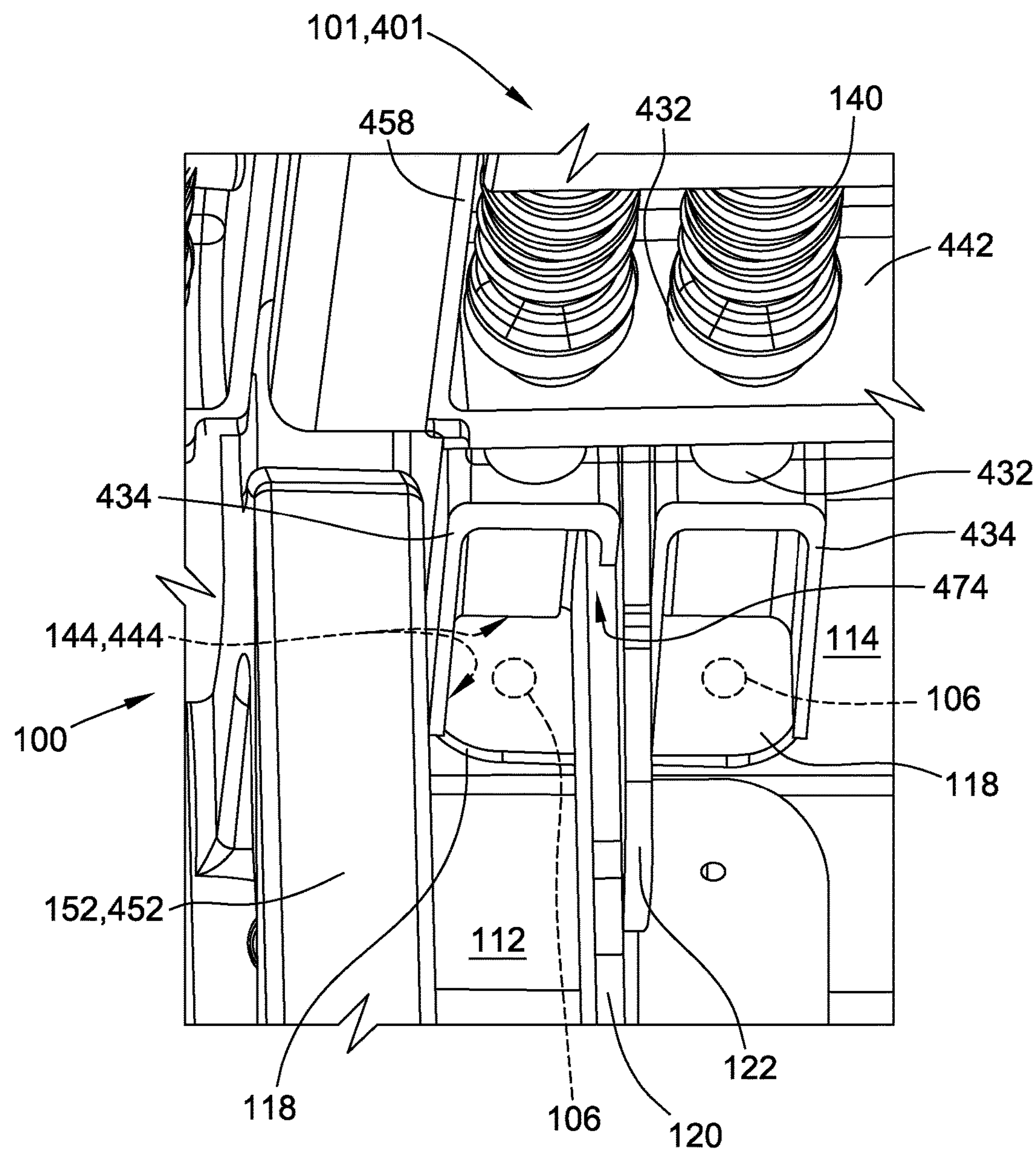
FIG. 5 is a schematic perspective view of an exemplary alternative embodiment of a foot that may be used with the exemplary reaction tool shown in FIG. 4.

FIG. 5 is a schematic perspective view of an exemplary alternative embodiment of foot 434 coupled to reaction tool 401. In certain embodiments, at least one opening location 106 is located sufficiently close to another component, such as splice angle 120 in the illustrated embodiment, that the other component potentially obstructs foot 434 having a U-shaped cross-section, as described above, from at least partially surround a corresponding opening location 106. Thus, in the illustrated embodiment, at least one foot 434 is provided with a generally L-shaped cross-section proximate clamping surface 444. For example, in the illustrated embodiment, foot 434 includes a partial leg 474 shaped such that partial leg 474 is not obstructed by splice angle 120 when clamping surface 444 is coupled to T-clip circumferential flange 118. Foot 434 having an L-shaped cross-section proximate clamping surface 444 enables clamping surface 444 to at least partially surround corresponding opening location 106 during application of forming tool 1002, and to transfer the reacted force from the opening location 106 to reaction bar 458. In alternative embodiments, foot 434 having an L-shaped cross-section does not include partial leg 474, but rather foot 434 has an L-shaped cross-section along substantially all of its length along radial direction 10. In other alternative embodiments, foot 434 has any suitable cross-section proximate clamping surface 444 that enables foot 434 to at least partially surround corresponding opening location 106 during application of forming tool 1002, and to transfer the reacted force from the opening location 106 to reaction bar 458.

Figure 6:
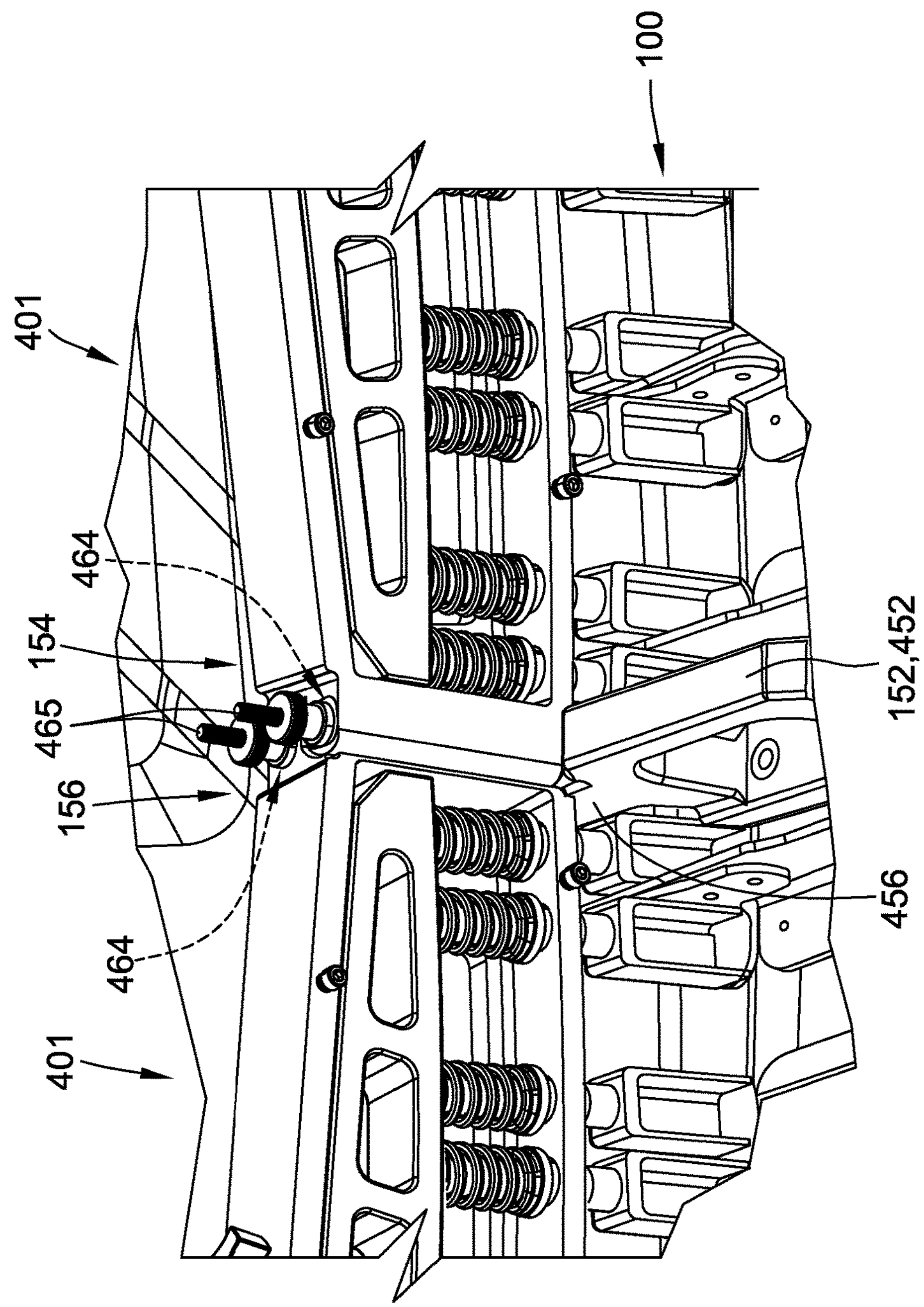
FIG. 6 is a schematic perspective view of two of the exemplary reaction tools shown in FIG. 4 coupled to the exemplary fuselage joint shown in FIG. 1.

FIG. 6 is a schematic perspective view of two exemplary reaction tools 401 coupled to fuselage joint 100 through a shared connector 452. More specifically, connector 452 and reaction tool 401 are configured such that each of first end 154 of a first reaction tool 401 and second end 156 of a second reaction tool 401 are coupleable to standoff 456 of the shared connector 452. In the illustrated embodiment, opening 464 defined in first end 154 of first reaction tool 401 is configured to be axially offset from opening 464 defined in second end 156 of second reaction tool 401 when first and second reaction tools 401 are positioned for coupling to connector 452. In addition, standoff 456 includes two connector openings 462 (shown in FIG. 4) that are similarly axially offset, such that a first of the two connector openings 462 aligns with opening 464 defined in first end 154 of first reaction tool 401 and a second of the two connector openings 462 aligns with opening 464 defined in second end 156 of second reaction tool 401 when first and second reaction tools 401 are positioned for coupling to connector 452. Thus, each of first end 154 of first reaction tool 401 and second end 156 of second reaction tool 401 is coupleable to standoff 456 using a respective fastener 465. In alternative embodiments, connector 452 and reaction tool 401 include any suitable structure that enables first reaction tool 401 and second reaction tool 401 to couple to shared connector 452. Coupling two reaction tools 401 to shared connector 452, rather than using a separate plurality of connectors for each reaction tool 401, decreases a time and an amount of tooling needed to couple a plurality of reaction tools 401 around a circumference of joint 100. In other alternative embodiments, at least one of connector 452 and reaction tool 401 are not configured such that each of first end 154 of first reaction tool 401 and second end 156 of second reaction tool 401 are coupleable to a shared connector 452.

Figure 7:
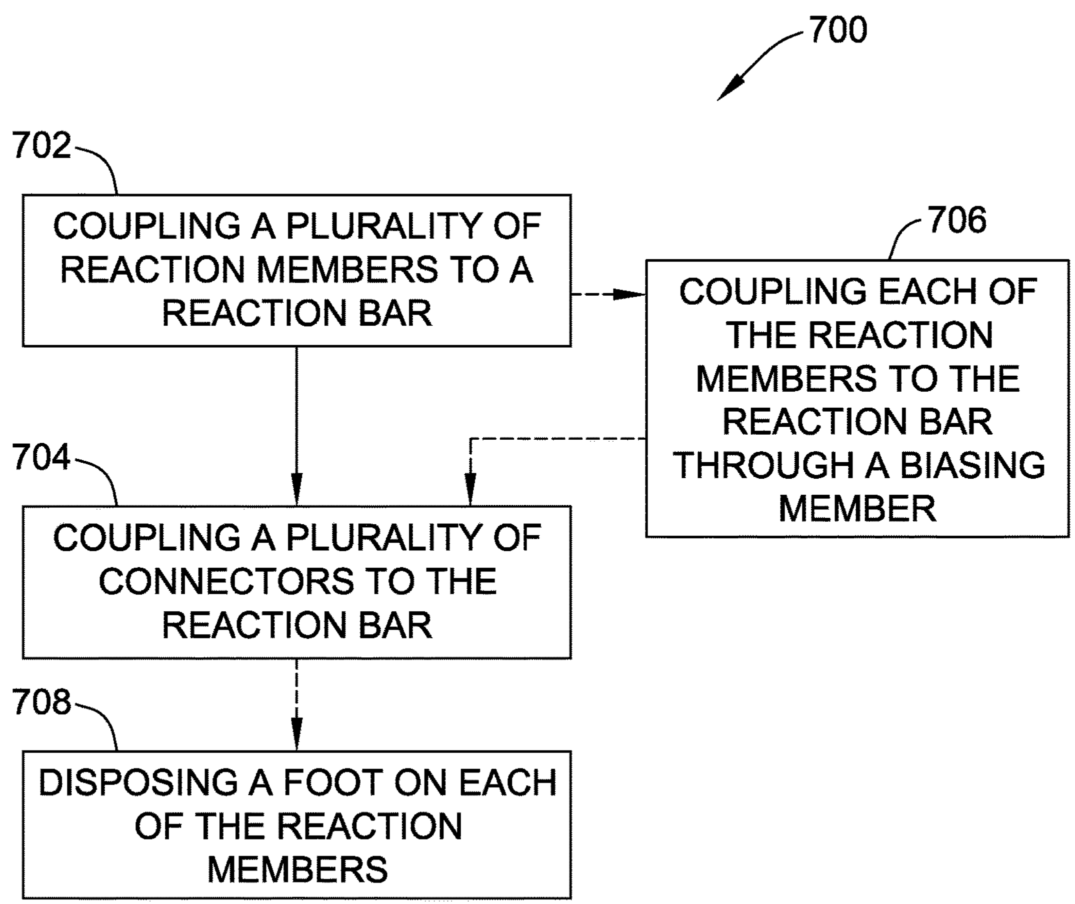
FIG. 7 is a flow diagram of an exemplary method of making openings in a fuselage joint, such as the exemplary fuselage joint shown in FIG. 1.

FIG. 7 is a flow diagram of an exemplary embodiment of a method 700 of making a reaction tool, such as any of reaction tools 101, 201, 301, and 401, for forming openings, such as fastener openings 1006, in an aircraft fuselage joint, such as joint 100. With reference to FIGS. 1-7 and 10, in the exemplary embodiment, the joint includes (i) a first side, such as joint first side 126, from which a forming tool, such as forming tool 1002, is to be applied at a plurality of opening locations, such as opening locations 106, and (ii) an opposing second side, such as joint second side 128. Method 700 includes coupling 702 a plurality of reaction members, such as any of reaction members 130, 230, 330, and 430, to a reaction bar, such as any of reaction bars 158, 258, 358, and 458. The reaction bar is configured to extend across the plurality of opening locations. Each of the reaction members includes a clamping surface, such as any of clamping surface 144, 244, 344, and 444, configured to couple to the joint second side such that each clamping surface at least partially surrounds a corresponding one of the plurality of opening locations.

Method 700 also includes coupling 704 a plurality of connectors, such as any of connectors 152, 252, 352, and 452, to the reaction bar. Each of the plurality of connectors is configured to couple to the joint second side. Additionally or alternatively, each of the reaction members is further configured to receive the forming tool as it extends from the joint first side through the joint second side at the corresponding opening location. Additionally or alternatively, the plurality of connectors is configured to couple to the joint second side at a plurality of auxiliary openings, such as at least some of auxiliary openings 124, spaced apart from the opening locations.

In certain embodiments, the step of coupling 702 the plurality of reaction members to the reaction bar comprises coupling 706 each of the reaction members to the reaction bar through a biasing member, such as biasing member 140, configured to urge the clamping surface against the joint second side. Additionally or alternatively, method 700 includes disposing 708 a foot, such as foot 334 or foot 434, on each of the reaction members, and the clamping surface of the reaction member is disposed on the foot.

FIG. 10 is a schematic section view of an exemplary embodiment of forming tool 1002 applied to joint 100 to form fastener openings 1006 at opening locations 106. Although a particular embodiment of reaction tool 101 (specifically, reaction tool 201 shown in FIG. 2) is illustrated as coupled to joint 100 during the forming process, it should be understood that any embodiment of reaction 101, including any of reaction tools 201, 301, and 401, alternatively can be coupled to fuselage joint 100 during the forming process. Moreover, although fasteners 1004 are illustrated as coupled within some of fastener openings 1006 while other openings 1006 are being formed, it should be understood that in some embodiments, no fasteners 1004 are installed until after an opening 1006 is formed at each opening location 106 spanned by reaction tool, and/or until after reaction tool 101 is uncoupled from joint 100.

Figure 11:
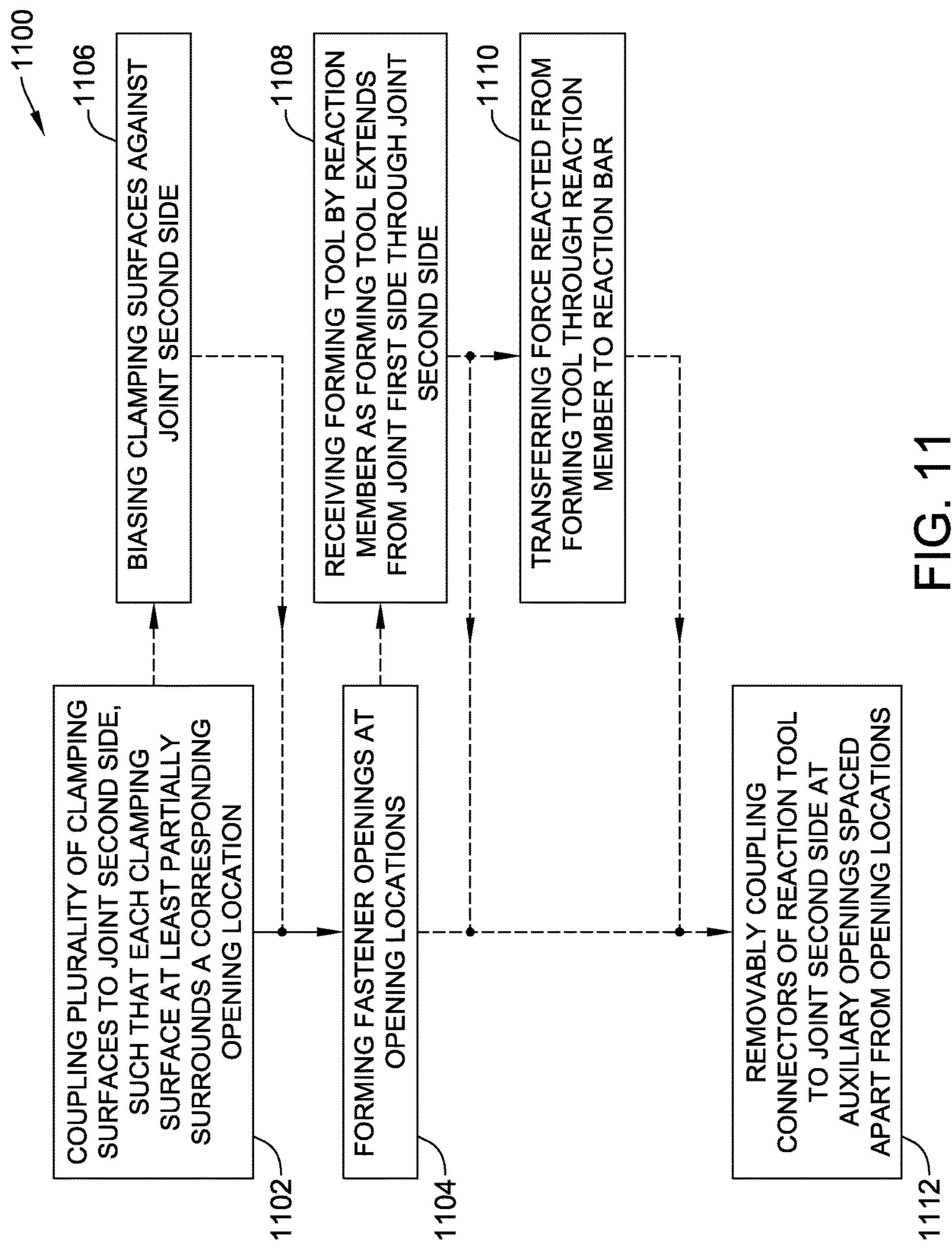
FIG. 11 is a flow diagram of an exemplary method of making fastener openings at a plurality of opening locations in an aircraft fuselage joint, such as the exemplary fuselage joint shown in FIG. 1.

FIG. 11 is a flow diagram of an exemplary embodiment of a method 1100 of making fastener openings, such as fastener openings 1006, at a plurality of opening locations, such as opening locations 106, in an aircraft fuselage joint, such as joint 100. With reference to FIGS. 1-7 and 10, in the exemplary embodiment, the joint includes a first side, such as joint first side 126, and an opposing second side, such as joint second side 128. Method 1100 includes coupling 1102 a plurality of clamping surfaces, such as any of clamping surface 144, 244, 344, and 444, of a reaction tool, such as any of reaction tools 101, 201, 301, and 401, to the joint second side, such that each clamping surface at least partially surrounds a corresponding one of the plurality of opening locations. Method 1100 also includes forming 1104 the fastener openings at the plurality of opening locations.

In certain embodiments, the step of coupling 1102 the plurality of clamping surfaces further comprises biasing 1106 the clamping surfaces against the joint second side, such as by biasing member 140. In some embodiments, each clamping surface is disposed on a reaction member, such as any of reaction members 130, 230, 330, and 430, of the reaction tool, and the step of forming 1104 the fastener openings further comprises receiving 1108 a forming tool, such as forming tool 1002, by the reaction member as the forming tool extends from the joint first side through the joint second side. Additionally, in certain embodiments, the step of forming 1104 the fastener openings further comprises transferring 1110 a force reacted from the forming tool through the reaction member to a reaction bar, such as any of reaction bars 158, 258, 358, and 458, of the reaction tool.

In some embodiments, method 1100 further comprises removably coupling 1112 a plurality of connectors, such as any of connectors 152, 252, 352, and 452, of the reaction tool to the joint second side at a plurality of auxiliary openings, such as any of auxiliary openings 124, spaced apart from the opening locations.

Referring again to the exemplary aircraft manufacturing and service method 800 as shown in FIG. 8 and the exemplary aircraft 902 as shown in FIG. 9, during pre-production, exemplary method 800 may include specification and design 804 of the aircraft 902 and material procurement 806. During production, component and subassembly manufacturing 808 and system integration 810 of the aircraft 902 takes place. Thereafter, the aircraft 902 may go through certification and delivery 812 in order to be placed in service 814. While in service by a customer, the aircraft 902 is scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 902 produced by exemplary method 800 may include an airframe 918 with a plurality of systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles of the disclosure may be applied to other industries, such as the automotive industry.

Apparatus and methods embodied herein may be employed during any one or more of the stages of the production and service method 800, and particularly during at least one of component and subassembly manufacturing 808, system integration 810, and routine maintenance and service 816 for airframe 918, for example. For example, components or subassemblies corresponding to production process 808 may be fabricated or manufactured in a manner similar to components or subassemblies produced while the aircraft 902 is in service. Also, one or more apparatus embodiments, method embodiments, or a combination thereof may be utilized during the production stages 808 and 810, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 816.

The embodiments described herein provide improvements over at least some known tools and methods for forming openings through a plurality of components. As compared to at least some known tools and methods for forming openings through a plurality of components, the embodiments described herein provide for reduction or elimination of interlaminate burring and debris when the openings are formed. For example, the embodiments provide a reaction tool having a reaction bar that extends across a plurality of opening locations, and a plurality of reaction members that each include a clamping surface that at least partially surrounds a corresponding one of the plurality of opening locations while the openings are formed. Thus, overlapping layers of the components are maintained in face-to-face coupled relationship along the joint during the forming process. The reduction or elimination of interlaminate burring and debris enables the joint to be completed without a need to uncouple the components to clean up interlaminate burrs and debris and to re-align the formed openings for insertion of the fasteners, thus reducing a time and cost required to complete the joint. Moreover, because the embodiments provide a reaction bar that extends over multiple opening locations, relatively fewer reaction tool installations are needed to cover the circumferential extent of the joint, further reducing a time and cost required to complete the joint.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A reaction tool for forming openings in an aircraft fuselage joint, the joint including (i) a first side from which a forming tool is to be applied at a plurality of opening locations and (ii) an opposing second side, said reaction tool comprising:

a plurality of connectors configured to couple to the joint second side;

a reaction bar coupled to said plurality of connectors, said reaction bar configured to extend across the plurality of opening locations; and a plurality of reaction members coupled to said reaction bar, each of said reaction members comprises a clamping surface configured to couple to the joint second side such that each said clamping surface at least partially surrounds a corresponding one of the plurality of opening locations.

2. The reaction tool of claim 1, wherein each said reaction member is further configured to transfer a force reacted from the forming tool to said reaction bar.

3. The reaction tool of claim 1, wherein each said reaction member is further configured to receive the forming tool as it extends from the joint first side through the joint second side at the corresponding opening location.

4. The reaction tool of claim 1, wherein each said reaction member is coupled to said reaction bar through a biasing member configured to urge said clamping surface against the joint second side.

5. The reaction tool of claim 4, wherein said biasing member is disposed within said reaction bar and configured to react against a top wall said reaction bar.

6. The reaction tool of claim 4, wherein said biasing member is disposed between said reaction bar and said clamping surface and is configured to react against an outer surface of said reaction bar.

7. The reaction tool of claim 4, wherein said biasing member is disposed within said reaction bar and configured to react against a strongback disposed within said reaction bar.

8. The reaction tool of claim 1, wherein said reaction tool is configured such that said clamping surfaces of said reaction members cooperate to present a profile that approximates a curvature of the aircraft fuselage joint.

9. The reaction tool of claim 1, wherein a circumferential position of at least one of said reaction members within said reaction bar is adjustable to facilitate aligning said reaction members with the opening locations.

10. The reaction tool of claim 1, wherein each said reaction member further comprises a foot disposed opposite said reaction bar, said clamping surface is disposed on said foot.

11. The reaction tool of claim 10, wherein said foot has a generally tubular shape.

12. The reaction tool of claim 10, wherein said foot has a shape that facilitates access to the opening location while said reaction tool is coupled to the aircraft fuselage joint.

13. The reaction tool of claim 10, wherein said foot has a generally U-shaped cross-section.

14. The reaction tool of claim 10, wherein said foot has a generally L-shaped cross-section.

15. The reaction tool of claim 1, wherein said plurality of connectors is configured to couple to the joint second side at a plurality of auxiliary openings spaced apart from the opening locations.

16. A method of making fastener openings at a plurality of opening locations in an aircraft fuselage joint, the joint including a first side and an opposing second side, said method comprising:

coupling a plurality of clamping surfaces of a reaction tool to the joint second side, such that each clamping surface at least partially surrounds a corresponding one of the plurality of opening locations, wherein each clamping surface is disposed on a reaction member of the reaction tool; and forming the fastener openings at the plurality of opening locations, wherein said forming the fastener openings comprises receiving a forming tool by the reaction member as the forming tool extends from the joint first side through the joint second side.

17. The method of claim 16, wherein said coupling the plurality of clamping surfaces further comprises biasing the clamping surfaces against the joint second side.

18. The method of claim 16, wherein said forming the fastener openings further comprises transferring a force reacted from the forming tool through the reaction member to a reaction bar of the reaction tool.

19. The method of claim 16, further comprising removably coupling a plurality of connectors of the reaction tool to the joint second side at a plurality of auxiliary openings spaced apart from the opening locations.

20. A method of making a reaction tool for forming openings in an aircraft fuselage joint, the joint including (i) a first side from which a forming tool is to be applied at a plurality of opening locations and (ii) an opposing second side, said method comprising:

coupling a plurality of reaction members to a reaction bar, the reaction bar configured to extend across the plurality of opening locations, wherein each of the reaction members comprises a clamping surface configured to couple to the joint second side such that each clamping surface at least partially surrounds a corresponding one of the plurality of opening locations; and coupling a plurality of connectors to the reaction bar, each of the plurality of connectors configured to couple to the joint second side.

21. The method of claim 20, wherein said coupling the plurality of reaction members to the reaction bar comprises coupling each of the reaction members to the reaction bar through a biasing member configured to urge the clamping surface against the joint second side.

22. The method of claim 20, wherein each of the reaction members is further configured to receive the forming tool as it extends from the joint first side through the joint second side at the corresponding opening location.

23. The method of claim 20, further comprising disposing a foot on each of the reaction members, wherein the clamping surface of the reaction member is disposed on the foot.

24. The method of claim 20, wherein the plurality of connectors is configured to couple to the joint second side at a plurality of auxiliary openings spaced apart from the opening locations.

* * * * *

UNITED STATES PATENT AND TRADEMARK OFFICE

CERTIFICATE OF CORRECTION

PATENT NO. : 9,682,429 B2
APPLICATION NO. : 14/692866
DATED : June 20, 2017
INVENTOR(S) : Eakins et al.

It is certified that error appears in the above-identified patent and that said Letters Patent is hereby corrected as shown below:

On the Title Page

Item (72), Inventors, delete "Maro Ellen Mansourian, Charlestown, SC (US); Diego Fernando Mayorga, Charlestown, SC (US);" and insert therefor -- Maro Ellen Mansourian, Charleston, SC (US); Diego Fernando Mayorga, Charleston, SC (US); --.

Signed and Sealed this
Third Day of October, 2017

Joseph Matal

Joseph Matal
*Performing the Functions and Duties of the*
*Under Secretary of Commerce for Intellectual Property and*
*Director of the United States Patent and Trademark Office*